Feb. 29, 1944.    M. TIBERGHIEN    2,342,825
RUBBER INSERT PAVING BLOCK
Filed June 9, 1941    2 Sheets-Sheet 1

Inventor
M. Tiberghien
By: Glascock Downing & Seebold
Attys.

Feb. 29, 1944.　　M. TIBERGHIEN　　2,342,825
RUBBER INSERT PAVING BLOCK
Filed June 9, 1941　　2 Sheets-Sheet 2

Inventor,
M. Tiberghien
By: Glascock Downing & Seibold
Attys.

Patented Feb. 29, 1944

2,342,825

UNITED STATES PATENT OFFICE 2,342,825

RUBBER-INSERT PAVING BLOCK

Marcel Tiberghien, Muizon, France; vested in the Alien Property Custodian

Application June 9, 1941, Serial No. 397,308
In France June 8, 1939

5 Claims. (Cl. 94—15)

In my co-pending application, Ser. No. 248,598, filed December 30, 1938, now Patent No. 2,287,844, issued June 30, 1942, I have described the arrangement of a ribbed rubber insert in the rolling surface of paving-blocks or slabs for road surfaces or pavements.

Said ribbed rubber insert is distinguished, in particular, by the shape of the cross section of its embedding ribs, said cross section being similar to that of a mushroom the profile of which presents only rounded curves of relatively large radius.

Owing to this cross section, having no sharp angles, the rubber preserves a certain sliding freedom in all directions against the walls, also rounded, of the rigid mass in which it is embedded, this allowing the insert to resiliently distort upon the passage of the loads without being subjected to excessive strain at any particular points; the pressures exerted against the rigid walls are in fact uniformly distributed and the risk of local breaking or of deterioration of the rubber and of the cement which would be inevitable if the contact surfaces had sharp angles, is eliminated, as well as the risk of the ribs of the insert being torn out of their housings.

On the other hand, said insert is quite independent of the iron fittings serving to reinforce the rigid block in which said insert is embedded; this independence avoids all dislodgement of the rubber and of the cement by the repeated distortion of metallic elements under the action of the rolling loads.

The present invention relates to the application of such rubber inserts, no longer to independent elements but to road coatings, made of concrete, asphaltic compounds or the like. The rubber inserts are then directly placed on the top layer before it sets so that their lower ribs are completely embedded therein and intimately fit therein when it sets.

The present invention has also for object the application of these characteristic arrangements to inserts of circular shape or more generally to inserts liable to be subjected to pulling off stresses according to any transverse and variable directions.

In the accompanying drawings which show an indicating and nonlimiting example of carrying out the invention.

Figs. 1 to 5 show, by way of example, a cement block of circular shape having a circular rubber insert, which can serve as a marker stud on public highways.

Figure 1:
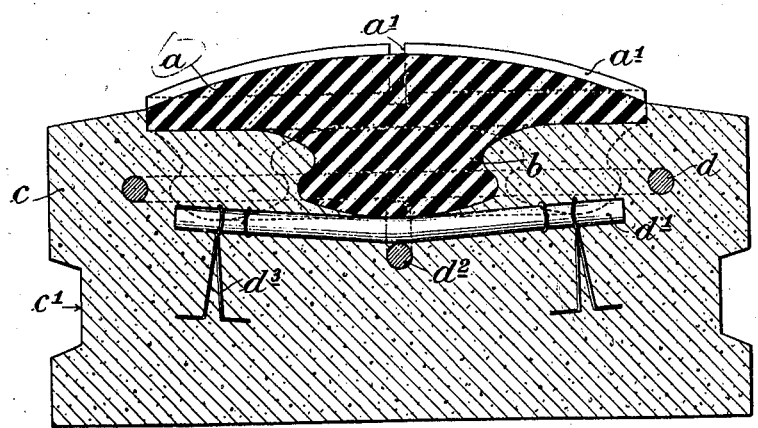
Figure 2:
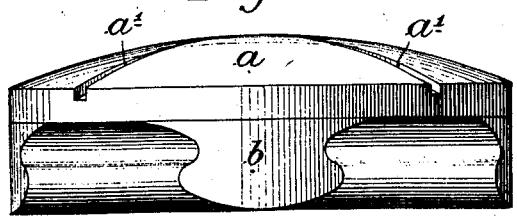
Figure 5:
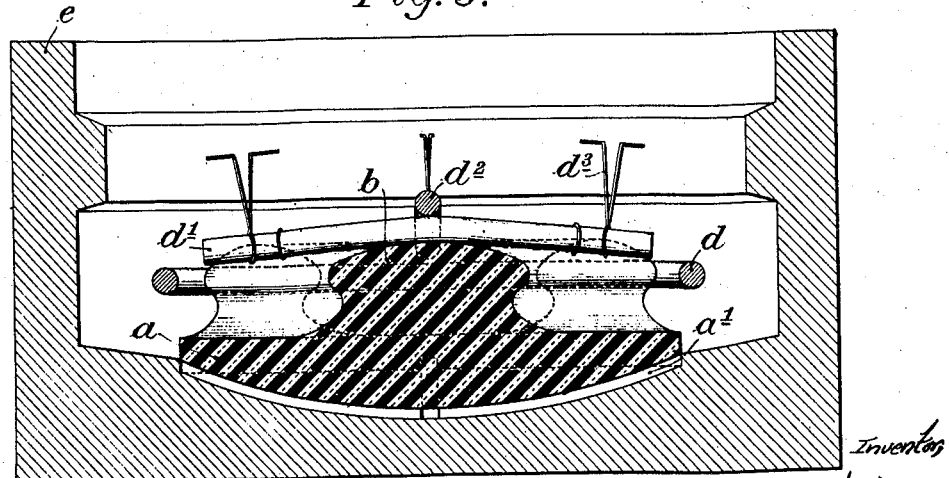
Figure 3:
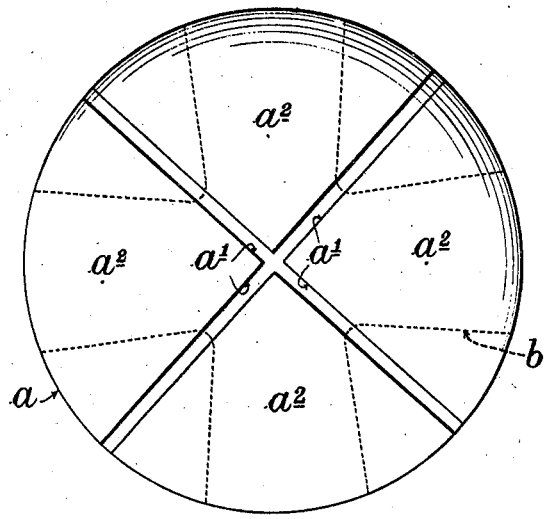
Figure 4:
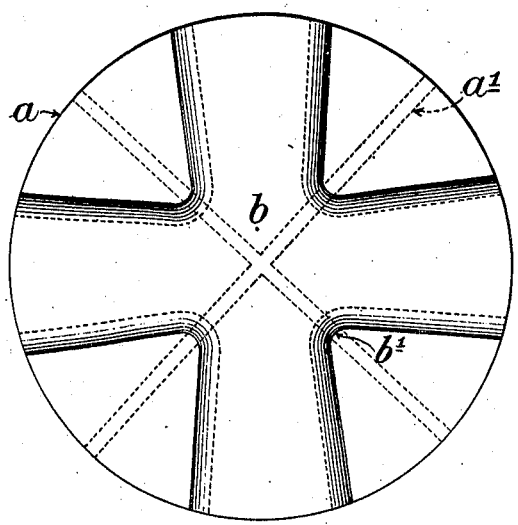

Figure 1 is a transverse vertical section taken through the stud; Figure 2 is an edge elevation of the insert shown in Figure 1 but taken at an angle of 45° from its position in Figure 1; Figures 3 and 4 are top and bottom plan views, respectively, of the insert; Figure 5 is a sectional view of the mold and inserted insert and reinforcing, taken on a vertical diametrical plane.

The inserts will be more generally spaced apart only in individual elements or groups of elements embedded in certain particular places of the pavement or road surface. In particular, their surface can to that effect be painted in a light colour so as to serve for marking purposes, for instance by forming the dotted line marking the middle of turns in roads where there is a large amount of traffic, and thus delimiting the spaces for the opposite lanes of traffic.

The inserts will obviously be arranged in such a manner that their lower ribs can freely work within the cavities of the pavement under the action of the wheels of the vehicles. They can also freely work under the action of expansions—which are not negligible in the case of a continuous pavement as they are in the case of a pavement composed of elementary paving-blocks or slabs.

Of course, without departing from the invention, various modifications can be made. The particular use to which the inserts are to be put will determine the detail characteristics to be given thereto.

Referring in detail to the drawings, it is convenient to provide the lower face of the insert with a plurality of ribs extending in different directions, for instance cross-wise or in star shape, all these ribs having the characteristic profile above mentioned.

Furthermore, in order to ensure a still more positive attachment of said ribs in the rigid mass of cement or the like which surrounds them, it is advantageous to give to each rib a cross section, which varies gradually at different points of its length; for instance, each rib can have a width increasing from the centre of the insert up to the periphery, and/or vary by means of undulations, etc.

In the example shown, the insert is formed of two rubber members $a$ and $b$ superposed and rendered rigid together by vulcanisation, said members being each moulded of rubber of a nature suited to its particular function; the member $a$ is to be resistant, in particular, to wear by friction, and the member $b$ in particular, to pulling off stresses; moreover, member $a$ can be coloured in its mass in order to serve for marking purposes.

Said member $a$ has the form of a disc, the upper face of which is bulged and presents two diametral grooves $a_1a_1$ arranged cross-wise and intended to increase the resiliency whilst allowing the intermediate portions of rubber $a_2a_2$ to flow one towards the other when they are crushed by a load.

The lower member $b$ has the shape of a cross the four branches of which are located under the solid parts $a_2$ and have a cross section in the shape of a mushroom or a knob of rounded contours, the width of each branch increasing from the centre to the outer end.

Fig. 4 shows that said branches are joined to each other also by rounded parts or beads $b_1$.

The insert thus constituted is embedded in a block of cement $c$ of cylindrical shape, having a circular groove $c_1$ in its periphery, and reinforced by iron fittings $dd_1$. Said iron fittings do not penetrate into the rubber and are completely embedded in the cement.

For moulding, the insert is placed on the bottom of the mould $e$; the iron fitting $d$ in the form of a collar, is placed about it and takes a bearing by clamping it on the ends of the branches $b$; then the iron fittings $d_1$, in the form of slightly bent rods, are placed cross-wise on the centre of the insert, according to planes bisecting the angles formed by the branches $b$. On said iron fittings can be previously secured hooks $d_3$ which must also be embedded in the cement. It then suffices to cast the cement in the mould.

It is to be understood that the invention includes all modifications comprising substantially equivalent arrangements; for instance, the number of branches $b$ or ribs of the insert, their shape, the number and the shape of the iron fittings, etc., can vary as well as the shape and dimensions of the block of cement or other rigid material.

I claim:

1. A pavement comprising a block of rigid material in one face of which there are provided a plurality of grooves starting radially from a central point, the said grooves having a swollen profile whose section narrows toward the said face and is connected with the said face by rounded edges with smooth walls, the said grooves constituting with each other ribs in the form of sectors of rigid material, rounded and smooth, a slab of rubber on the said face of the said block, ribs of rubber connected with the bottom face of the said slab, the number of the said ribs being equal to that of the said grooves, and being lodged in the said grooves, and having a transversal section exhibiting a top swelling of flat section, and a bottom swelling, the said two swellings being connected by a narrowing middle part having rounded and smooth contours.

2. A pavement comprising a block of rigid material in one face of which there are provided a plurality of grooves starting radially from a central point, and whose width increases from the said central point toward the ends, the said grooves having a swollen profile, whose section narrows toward the said face, and is connected with the said face by rounded edges with smooth walls, the said grooves constituting with each other ribs in the form of sectors of rigid material, rounded and smooth, a slab of rubber on the said face of the said block, ribs of rubber connected with the bottom face of the said slab starting radially from a central point of the said slab and having a width which increases from the said central point toward the ends, the number of the said ribs being equal to that of the said grooves, and being lodged in the said grooves, and having a transversal section exhibiting a top swelling of flat section, and a bottom swelling, the said two swellings being connected by a narrowing middle part having round and smooth contours.

3. A pavement comprising a block of rigid material in one face of which there are provided a plurality of grooves starting radially from a central point, the said grooves having a swollen profile, whose section narrows toward the said face and is connected with the said face by rounded edges with smooth walls, the said grooves constituting with each other ribs in the form of sectors of rigid material, rounded and smooth, a slab of rubber on the said face of the said block, ribs of rubber connected with the bottom face of the said slab and starting radially from a central point of the said slab, the number of the said ribs being equal to that of the said grooves, and being lodged in the said grooves, and having a transversal section exhibiting a top swelling of flat section, and a bottom swelling, the said two swellings being connected by a narrowing middle part having rounded and smooth contours, the said top swelling of flat section having a convex top face in which there are provided channels starting radially from a central point and situated in the middle between the said ribs of rubber of the said slab.

4. A pavement comprising a block of rigid material in one face of which there are provided a plurality of grooves starting radially from a central point, the said grooves having a swollen profile whose section narrows toward the said face and is connected with the said face by round edges with smooth walls, the said grooves constituting with each other ribs in the form of sectors of rigid material, rounded and smooth, a slab of rubber on the said face of the said block, ribs of rubber connected with the bottom face of the said slab and starting radially from a central point of the said slab, the number of the said ribs being equal to that of the said grooves, and being lodged in the said grooves, and having a transversal section exhibiting a top swelling of flat section, and a bottom swelling, the said two swellings being connected by a narrowing middle part having rounded and smooth contours, metal stays sunk into the rigid material of the said block below the ribs of the said slab, a metal ring sunk into the rigid material of the said block all around and concentrically to the said slab.

5. A pavement comprising a block of rigid material in one face of which there are provided a plurality of grooves starting radially from a central point, and whose width increases from the said central point toward the ends, the said grooves having a swoolen face whose section narrows toward the said face and is connectd with the said face by rounded edges with smooth walls, the said grooves constituting with each other ribs in the form of sectors of rigid material, rounded and smooth, a slab of rubber on the said face of the said block, ribs of rubber connected with the bottom face of the said slab, starting radially from a central point of the said slab and having a width which increases from the said central point toward the ends, the number of the said ribs being equal to that of the said grooves, and being lodged in the said grooves, and having a transversal section exhibiting a top swelling of flat section, and a bottom swelling, the said two swellings being connected by a narrowing middle part having a rounded and smooth contour, the said top swelling of flat section having a convex top face in which there are provided grooves starting radially from a central point and situated in the axis of the said ribs of rubber of the said slab, steel stays sunk into the rigid material of the said block below the ribs of the said slab, and a metal ring sunk into the rigid material of the said block all around and concentrically to the said slab.

MARCEL TIBERGHIEN.